April 19, 1955 H. A. LILJENBERG 2,706,418
PEDAL BRACKET

Filed May 10, 1954 2 Sheets-Sheet 1

INVENTOR.
HARRY A. LILJENBERG
BY
*Gustav A. Wolff*
ATT.

April 19, 1955  H. A. LILJENBERG  2,706,418
PEDAL BRACKET
Filed May 10, 1954  2 Sheets-Sheet 2
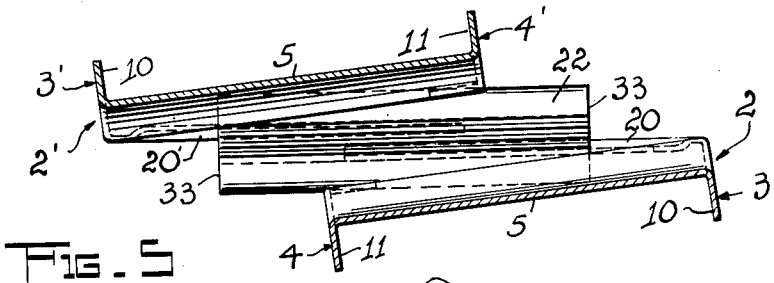
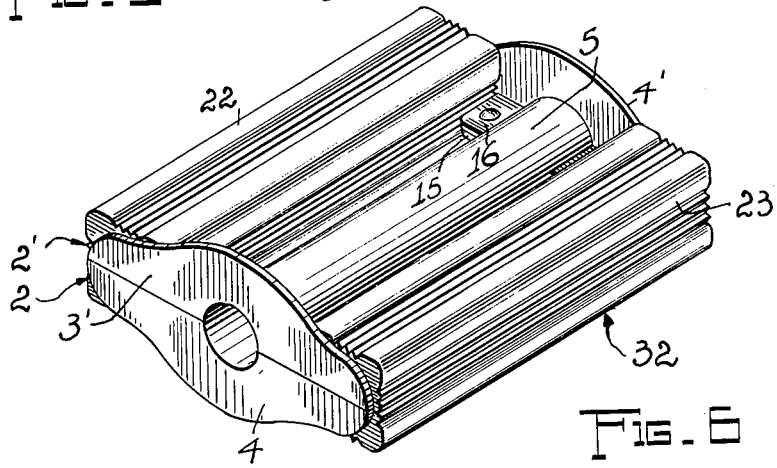
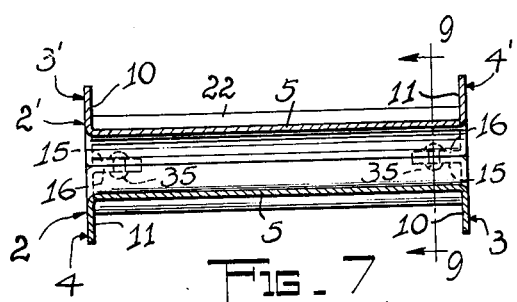
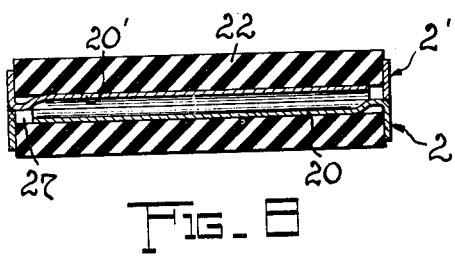
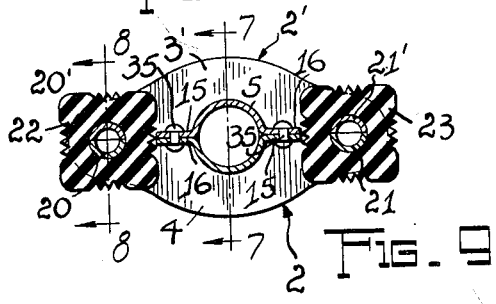
INVENTOR.
HARRY A. LILJENBERG
BY
Gustav A. Wolff
ATT.

United States Patent Office 2,706,418
Patented Apr. 19, 1955

2,706,418

PEDAL BRACKET

Harry A. Liljenberg, Cleveland, Ohio, assignor to Modern Tool & Die Company, Cleveland, Ohio, a corporation of Ohio Application May 10, 1954, Serial No. 428,645

7 Claims. (Cl. 74—594.4)

This invention relates in general to pedals and, more particularly, to pedal brackets adapted to form frame structures for pedals to be mounted on operating cranks of bicycles, tricycles, and similar vehicles.

The primary object of the invention is the provision of an improved, simple pedal bracket constructed to be economically manufactured and to be readily and easily assembled in pairs to form simple, durable frame structures for bicycle pedals.

Another object of the invention is the provision of a simple and economic pedal bracket formed as a unitary structure and constructed to permit in pairs their assembly to strong and durable frame structures for bicycle pedals when two brackets in inverted position are placed into contact with each other and secured to each other.

A further object of the invention is the provision of a unitary, simple and economic pedal bracket of the type referred to above, in which laterally spaced elongated end walls formed with elongated straight edges and half-circular recesses in said straight edges midway thereof are connected to each other by an elongated cross member of half-circular cross section axially aligned with said recesses and integrally extended from said two end walls, and in which one end wall has integrally and symmetrically extended therefrom in a direction toward the other end wall two cantilever-like supporting arms terminating in spaced relation from such other end wall.

Still another object of the invention is the provision of a bicycle pedal formed by two of the described pedal brackets secured to each other in inverted and reversed position with respect to each other and two axially perforated tread blocks positioned between the end walls of the two brackets and supported by the described supporting arms extended from opposite ends into the bores of such tread blocks, the cross members of the two pedal brackets providing a pedal having a cylindrical bushing and permitting its proper pivotal mounting on axle shafts of operating cranks for bicycles.

A still further object of the invention is the provision of a unitary pedal bracket of the type referred to in which the supporting arms are extended in inclined relation to the cross member of the bracket to facilitate in assembling two brackets and two tread blocks to a bicycle pedal the threading of the supporting arms of the brackets from opposite ends into the bores of such tread blocks.

In addition, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawing forming part of the specification.

In the drawings:

Fig. 5 is a longitudinal sectional view taken on line 5—5 of Fig. 2;

Fig. 6 is a perspective view of a bicycle pedal including pedal brackets constructed in accordance with the invention;

Fig. 7 is a central longitudinal sectional view through a bicycle pedal taken on line 7—7 of Fig. 9;

Fig. 8 is a longitudinal sectional view taken on line 8—8 of Fig. 9; and

Fig. 9 is a transversal sectional view taken on line 9—9 of Fig. 7.

Figure 1:
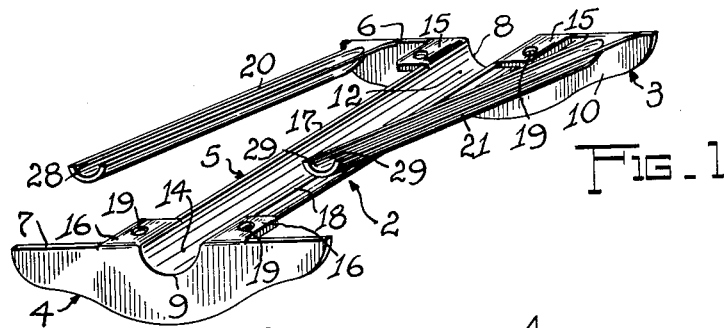
Fig. 1 is a perspective view of a pedal bracket constructed in accordance with the invention.

Referring now in detail to the exemplified form of the invention shown in the drawings, reference numeral 2 represents a stamped pedal bracket for bicycle pedals, which bracket embodies two elongated parallelly arranged end plates 3 and 4 connected by an elongated half-tubular member 5 of semi-circular cross section. The end plates are formed with substantially straight margins 6 and 7, include half-circular recesses 8 and 9 within margins 6 and 7 midway between their opposite ends and have integrally extended from their opposed faces 10 and 11 at right angles with respect thereto half-tubular member 5 arranged in axial alignment with respect to recesses 8 and 9 to provide an integrally shaped, symmetrically constructed pedal bracket 2. The tubular member 5 includes laterally extended from its opposite ends 12 and 14 flanges 15 and 16 which are arranged flush with respect to margins 6 and 7 and margins 17 and 18 of half-tubular member 5 and blend into these margins to reenforce pedal bracket 2 in these areas and provide land portions facilitating assembly procedures by permitting proper alignment and attachment of two pedal brackets in inverted and reversed relation to each other, as will be later described.

Flanges 15 and 16 include perforations 19 to permit attachment of the brackets to each other by rivets or screws, however, instead of perforations flanges 15 and 16 may include welding projections (not shown) to permit welding of the brackets to each other. The thus constructed pedal bracket in addition embodies longitudinally grooved cantilever-like supporting arms 20 and 21 to mount the customary tread blocks 22, 23 of bicycle pedals. These supporting arms are symmetrically arranged to each other, extend integrally from inner face 10 of end plate 3 flush with its margin edge 6 toward inner face 10 of end plate 3 and form cantilever-like supports for tread blocks 22, 23 when extended into axial bores 26, 27 of said blocks.

Figure 2:
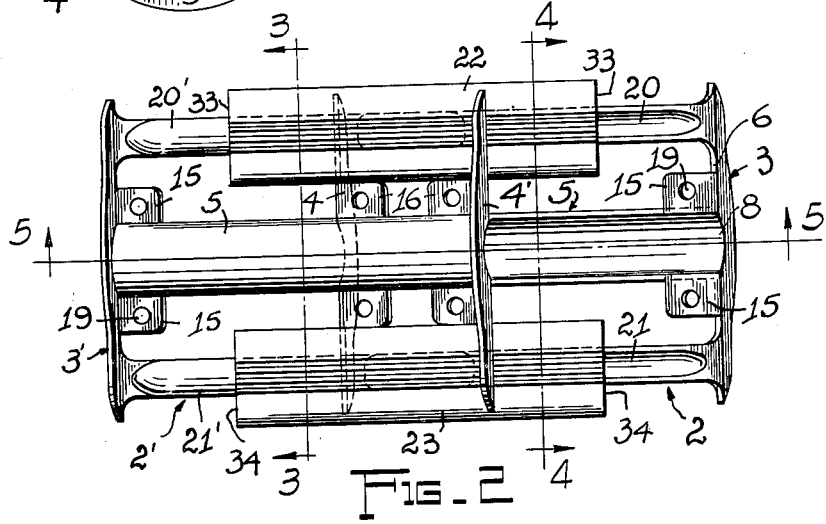
Fig. 2 is a plan view of a bicycle pedal in the process of being assembled, the pedal including pedal brackets of the type disclosed in Fig. 1.
Figure 3:
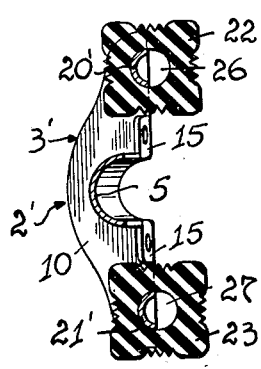
Fig. 3 is a transverse sectional view taken on line 3—3 of Fig. 2.
Figure 4:
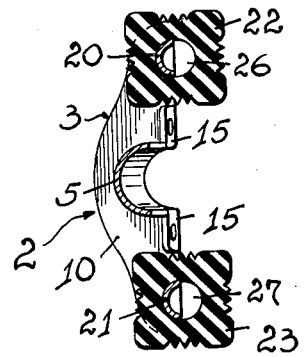
Fig. 4 is a transversal sectional view taken on line 4—4 of Fig. 2.

The thus constructed supporting arms 20 and 21, which are somewhat shorter than half-tubular member 5 and arranged parallel to each other, extend at an angle to the longitudinal axis of member 5 to position the ends 28, 29 of said supporting arms in spaced relation from the margin or edge 7 of end plate 3 and permit in assembly proceedings insertion of such ends into axial bores of the tread blocks (see Figs. 2 through 5).

In assembling pedal brackets and tread blocks such as described above to a bicycle pedal 32 (see Fig. 6), two of the pedal brackets 2, 2' are arranged in inverted recessed position with respect to each other and their supporting arms 20, 21 and 20', 21' are threaded at opposite ends of tread blocks 22, 23 into the bores 26, 27 thereof until end plates 3, 3' and 4, 4' contact end faces 33, 34 of tread blocks 22, 23. When thus engaged with the tread blocks 22, 23 the two pedal brackets 2, 2' are forced toward each other to effect contact between their flanges 15 and 16 and margins 6, 7 and 17, 18 and riveted to each other by rivets 35 extended through the perforations 19 in flanges 15 and 16.

The thus constructed bicycle pedals are of simple durable construction, as their frame structures are formed by two identically shaped, stamped pedal brackets, as their tread blocks are supported throughout by cantilever-like supporting arms, two of which extend from opposite sides into each axial bore of the tread blocks, and as the cooperating half-tubular members of these pedal brackets provide such pedals with cylindrically shaped through passages permitting proper pivotal support of the pedals on the axle shafts of operating cranks for bicycles.

Preferably, tread blocks 22, 23 of bicycle pedal 32 have square cross sections and flanges 15, 16 of pedal brackets 2, 2' are shaped to engage such tread blocks to prevent their axial rotation on supporting arms 20, 21.

Having thus described my invention what I claim is:

1. In a pedal bracket for bicycle pedals and the like two similarly shaped elongated end plates arranged in opposed parallelly spaced relation with respect to each other, a connecting member having half-tubular cross section between said end plates connected thereto and forming therewith a bracket member having a channel open at opposite ends, and a pair of parallelly arranged elongated cantilever-like supporting arms shorter than said connecting member, said arms having their one ends attached to one of said end plates in symmetrical relation with respect to the connecting member and their other ends extended toward the other end plate.

2. A pedal bracket as described in claim 1, wherein the supporting arms are extended from said one end plate at an inclination with respect to the connecting member to position the other ends of the arms in spaced relation to the other end plate.

3. A pedal bracket as described in claim 1, wherein the connecting member and the supporting arms are formed integrally with the end plates to provide a unitary bracket structure.

4. In a pedal bracket for bicycle pedals and the like two similarly shaped elongated end plates arranged in opposed parallelly spaced relation with respect to each other, said end plates including straight margins and half-circularly shaped recesses extended from said straight margins midway between opposite ends of said plates, a connecting member having half-tubular cross section arranged between said end plates in axial alignment with their recesses, flanges connecting the end portions of the connecting member with the end plates, and a pair of parallelly arranged elongated cantilever-like supporting arms shorter in length than said connecting member, said supporting arms being extended from one end plate in inclined symmetrical relation to the connecting member to position the free ends of these arms in spaced relation to the other end plate, the said connecting member flanges and the said supporting arms formed integrally with the end plates to provide a unitary bracket structure.

5. In a pedal for bicycles and the like two similarly shaped pedal brackets, each being formed with an open-ended through channel of half-tubular cross section and cantilever-like parallel supporting arms arranged in laterally spaced symmetrical relation to said through channels, and two perforated tread bars each being sleeved upon and supported by one of the cantilever-like supporting arms of each of said pedal brackets, said pedal brackets being arranged in inverted reversed position with respect to each other to provide the pedal with a longitudinal through passage and extend the cantilever-like supporting arms of the pedal brackets in opposite directions when threaded into the perforations of the two tread bars.

6. A pedal as described in claim 5, wherein the cantilever-like cooperating supporting arms of the pedal brackets are dimensioned to overlap each other when threaded into the respective perforations of the two tread bars.

7. A pedal as described in claim 6, wherein the cantilever-like supporting arms have substantially half-tubular cross section to stiffen said arms and provide by the overlapping portions of these arms tread bar supporting means of substantially circular, tubular cross section.

References Cited in the file of this patent

UNITED STATES PATENTS

| 281,889 | Knous | July 24, 1883 |

FOREIGN PATENTS

| 644,954 | France | June 25, 1928 |
| 808 | Great Britain | Nov. 25, 1909 |